US 7,526,468 B2

(12) United States Patent
Vincent et al.

(10) Patent No.: US 7,526,468 B2
(45) Date of Patent: Apr. 28, 2009

(54) SYSTEM AND METHOD FOR RECURSIVE PATH ANALYSIS OF DBMS PROCEDURES

(75) Inventors: John K. Vincent, Richmond, CA (US); Igor Cherny, San Francisco, CA (US)

(73) Assignee: Computer Associates Think, Inc., Islandia, NY (US)

( * ) Notice: Subject to any disclaimer, the term of this patent is extended or adjusted under 35 U.S.C. 154(b) by 115 days.

(21) Appl. No.: 09/226,939

(22) Filed: Jan. 8, 1999

(65) Prior Publication Data

US 2001/0049682 A1  Dec. 6, 2001

(51) Int. Cl.
*G06F 17/30* (2006.01)
*G06F 17/00* (2006.01)

(52) U.S. Cl. .............. 707/2; 707/4; 707/10; 707/100; 707/104.1; 717/100; 717/105; 717/106; 717/136; 717/137; 715/500; 715/530

(58) Field of Classification Search .............. 707/1–10, 707/100–104.1, 203; 709/219, 330, 332, 709/106; 717/4, 8, 1, 5, 7, 108, 126, 129, 717/145–146, 153, 162, 104, 112, 141, 177; 710/14
See application file for complete search history.

(56) References Cited

U.S. PATENT DOCUMENTS

| 4,330,822 | A | * | 5/1982 | Dodson ...................... 717/162 |
| 4,558,413 | A | * | 12/1985 | Schmidt et al. ............. 707/203 |
| 4,829,427 | A | * | 5/1989 | Green ........................... 707/4 |
| 5,038,348 | A | | 8/1991 | Yoda et al. ..................... 371/19 |
| 5,170,465 | A | * | 12/1992 | McKeeman et al. ............. 717/4 |
| 5,175,856 | A | | 12/1992 | Van Dyke et al. ............. 395/700 |
| 5,201,046 | A | * | 4/1993 | Goldberg et al. ............. 707/100 |
| 5,237,691 | A | * | 8/1993 | Robinson et al. ............. 717/107 |
| 5,303,367 | A | * | 4/1994 | Leenstra et al. ............. 707/102 |
| 5,325,531 | A | * | 6/1994 | McKeeman et al. ......... 717/145 |
| 5,343,554 | A | * | 8/1994 | Koza et al. ..................... 706/13 |
| 5,404,428 | A | | 4/1995 | Wu ............................ 395/133 |
| 5,442,791 | A | * | 8/1995 | Wrabetz et al. ............. 709/330 |
| 5,490,246 | A | * | 2/1996 | Brotsky et al. .............. 715/763 |
| 5,493,682 | A | * | 2/1996 | Tyra et al. ................... 717/122 |
| 5,546,570 | A | * | 8/1996 | McPherson et al. ............ 707/4 |

(Continued)

FOREIGN PATENT DOCUMENTS

WO  WO 92/15066  *  2/1991

OTHER PUBLICATIONS

"The Generalized Counting Method for Recursive Logic Queries"—C. Zaniob, J. Theoretical Computing Science—1998 (pp. 1-23).*

(Continued)

*Primary Examiner*—John E Breene
*Assistant Examiner*—Anh Ly
(74) *Attorney, Agent, or Firm*—Baker Botts L.L.P.

(57) ABSTRACT

A system, method and database development tool are disclosed for automatically generating the complete dependency graph for use in debugging stored code objects in a database, by using a recursive dependency tracking algorithm which takes into consideration the indirect dependencies on triggers as well as the dependencies on implementations of object oriented code objects which are represented as separate objects in the database catalog.

35 Claims, 9 Drawing Sheets

U.S. PATENT DOCUMENTS

| | | | |
|---|---|---|---|
| 5,546,571 A * | 8/1996 | Shan et al. ..................... 707/3 |
| 5,560,009 A | 9/1996 | Lenkov et al. .............. 395/700 |
| 5,561,763 A * | 10/1996 | Eto et al. ...................... 707/10 |
| 5,586,328 A * | 12/1996 | Caron et al. ................ 717/146 |
| 5,615,333 A | 3/1997 | Juettner et al. ......... 395/183.14 |
| 5,649,204 A | 7/1997 | Pickett ....................... 395/200 |
| 5,651,111 A * | 7/1997 | McKeeman et al. ........... 714/38 |
| 5,671,416 A * | 9/1997 | Elson ......................... 717/106 |
| 5,689,711 A | 11/1997 | Bardasz et al. .............. 395/701 |
| 5,692,193 A * | 11/1997 | Jagannathan et al. ........ 709/106 |
| 5,724,556 A | 3/1998 | Souder et al. ............... 395/500 |
| 5,751,287 A | 5/1998 | Hahn et al. ................. 715/775 |
| 5,758,160 A * | 5/1998 | McInerney et al. .......... 717/104 |
| 5,761,493 A * | 6/1998 | Blakeley et al. ................ 707/4 |
| 5,764,989 A * | 6/1998 | Gustafsson et al. ......... 717/129 |
| 5,774,725 A * | 6/1998 | Yadav et al. ................ 717/135 |
| 5,805,804 A * | 9/1998 | Laursen et al. .............. 709/223 |
| 5,809,283 A * | 9/1998 | Vaidyanathan et al. ........ 703/16 |
| 5,813,000 A | 9/1998 | Furlani .......................... 707/3 |
| 5,815,714 A * | 9/1998 | Shridhar et al. ............. 717/129 |
| 5,826,077 A * | 10/1998 | Blakeley et al. ................ 707/4 |
| 5,826,256 A * | 10/1998 | Devanbu ........................ 707/4 |
| 5,832,484 A * | 11/1998 | Sankaran et al. ............... 707/9 |
| 5,835,777 A * | 11/1998 | Staelin ....................... 717/175 |
| 5,848,274 A * | 12/1998 | Hamby et al. ............... 717/153 |
| 5,850,554 A * | 12/1998 | Carver ........................ 717/162 |
| 5,872,973 A * | 2/1999 | Mitchell et al. ............. 709/332 |
| 5,875,334 A * | 2/1999 | Chow et al. ................. 717/141 |
| 5,925,100 A * | 7/1999 | Drewry et al. .............. 709/219 |
| 5,926,819 A * | 7/1999 | Doo et al. ................ 707/104.1 |
| 5,970,490 A * | 10/1999 | Morgenstern ............ 707/104.1 |
| 5,983,233 A * | 11/1999 | Potonniee .................... 707/103 |
| 5,987,450 A * | 11/1999 | Levy ............................. 707/3 |
| 5,995,958 A * | 11/1999 | Xu ................................ 707/3 |
| 6,094,528 A * | 7/2000 | Jordan .......................... 717/4 |
| 6,108,659 A * | 8/2000 | Vincent ...................... 707/101 |
| 6,151,701 A * | 11/2000 | Humphreys et al. ......... 717/130 |
| 6,178,546 B1 * | 1/2001 | McIntyre .................... 717/177 |
| 6,199,063 B1 * | 3/2001 | Colby et al. ................... 707/4 |
| 6,249,882 B1 * | 6/2001 | Testardi ....................... 714/38 |
| 6,311,216 B1 * | 10/2001 | Smith et al. ................. 709/226 |
| 6,314,555 B1 * | 11/2001 | Ndumu et al. .............. 717/110 |
| 6,314,558 B1 * | 11/2001 | Angel et al. ................ 717/118 |
| 6,334,128 B1 * | 12/2001 | Norcott et al. ................. 707/5 |
| 6,348,927 B1 * | 2/2002 | Lipkin ........................ 345/619 |
| 6,366,876 B1 * | 4/2002 | Looney ....................... 707/10 |
| 6,370,681 B1 * | 4/2002 | Dellarocas et al. .......... 717/110 |
| 6,405,212 B1 * | 7/2002 | Samu et al. ............. 707/103 R |
| 6,460,043 B1 * | 10/2002 | Tabbara et al. .............. 707/100 |
| 6,493,868 B1 * | 12/2002 | DaSilva et al. .............. 717/105 |
| 6,651,111 B2 * | 11/2003 | Sherman et al. ............. 709/200 |
| 6,668,325 B1 * | 12/2003 | Collberg et al. ............. 713/194 |
| 6,769,124 B1 * | 7/2004 | Schoening et al. .......... 707/102 |
| 7,047,249 B1 * | 5/2006 | Vincent ...................... 707/102 |
| 2003/0058286 A1 | 3/2003 | Dando ........................ 715/853 |
| 2003/0115545 A1 * | 6/2003 | Hull et al. ................... 715/500 |
| 2004/0015833 A1 * | 1/2004 | Dellarocas et al. .......... 717/106 |

OTHER PUBLICATIONS

"An Amateur's Introduction to Recursive Query Processing Strategies"—F. Bancilhon & R. Ramakrishnan—Proceedings of the ACM-SIGMOD conference, Washington D.C,, May 1986 (pp. 1-37).*

"Alpha: An Extension of Relational Algebra to Exproess a Claaa of Recursive Queries"—Proceedings of the 3rd International Conference on Data Engineering, Los Angeles, California, Feb. 3-5, 1987 (pp. 1-3).*

Chen, Yih-Farn, "Dagger: A Tool to Generate Program Graphs" (Apr. 1994), UNIX Applications Development, Symposium Proceedings, Toronto, Ontario, Canada, pp. 19-35.

Crestana-Taube, Viviane, et al., "Consistent View Removal in Transparent Schema Evolution Systems" (Feb. 1996), IEEE Computer Society Press, Proceedings: Sixth International Workshop on Research Issues in Data Engineering, pp. 138-147.

Harrold, Mary Jean, et al., "A Unified Interprocedural Program Representation for a Maintenance Environment" (Oct. 1991), IEEE Computer Society Press, Proceedings: Conference on Software Maintenance 1991, pp. 138-147.

Kamkar, Mariam, et al., "Affect-Chaining and Dependency Oriented Flow Analysis Applied to Queries of Progress" (May 1988) ACTES/Proceedings Symposium 1988 ACM SIGSMLL/PC, pp. 36-43.

Oracle, PL/SQL User's Guide and Reference, Preface, pp. i-vii.

Oracle, "Oracle8i™—The Database for Internet Computing" (Nov. 1998), pp. 1-13.

Oracle, "Oracle7™ Server Application Developer's Guide" (Dec. 1992), Chapter 7, "Using Procedures and Packages" pp. 7-1 thru 7-24.

Oracle, "Oracle7™ Server Application Developer's Guide" (Dec. 1992), Chapter 8, "Using Database Triggers" pp. 8-1 thru 8-29.

Powell, Michael L., et al., "A Database Model of Debugging" (1983), The Journal of Systems and Software 3, 295-300, pp. 295-299.

Internet, "Create Type" (Jan. 1999), pp. 1-9.

Communication from EP Patent Office re Application No. 00 905 546.8—1243, regarding formalities of the application.

Livadas et al., "Program Dependence Analysis", Computer and Information Sciences Department, University of Florida, Gainsville, FL 32611, pp. 356-365.

Anonymous: "*MeshMaker Tutorial*", Internet Article, XP-002358013, retrieved from http://www.eecs.harvard.edu/{gotsman/geommodel/software/html/tutorial.html> (4 pages), Dec. 8, 2005.

Anonymous: "*Universal Explorer 4.2*", Online Help, XP-002358011, retrieved from http://www.spadixbd.com/universal/ue.exe> (58 pages), Dec. 9, 2005.

Anonymous: "*Universal Explorer 4.2*" download screen from FileDudes, XP-002358452, (2 pages), Dec. 12, 2005.

Notification of Transmittal of the International Search Report and the Written Opinion of the International Searching Authority for International Application No. PCT/US2005/017784, filed May 19, 2005 (14 pages), Dec. 29, 2005.

* cited by examiner

| | | |
|---|---|---|
| Object Number | 1 | 71 |
| Object Name | CHECKGENDER | 72 |
| User Name | DEBUGGER | 73 |
| Remote Flag | No | 74 |
| Object Type | Function | 75 |
| Child Object # 1 | 2 | 76 |
| ⋮ | ⋮ | 76 |
| Child Object # n | | 76 |

Fig. 7

200 An Exemplary General Purpose Computer

SYSTEM AND METHOD FOR RECURSIVE PATH ANALYSIS OF DBMS PROCEDURES

CROSS-REFERENCE TO RELATED APPLICATIONS

This application is related to application Ser. No. 09/219,253 entitled "METHOD AND APPARATUS FOR EXECUTING STORED CODE OBJECTS IN A DATABASE," filed Dec. 22, 1998.

TECHNICAL FIELD

The invention relates to the field of computer-related systems and methods. More specifically, the invention is a system and method for automatically generating complete dependency information of DBMS Stored code objects.

BACKGROUND ART

It is desirable to provide efficient and cost effective processes for generating queries to a data base management system. In today's world of Relational Data Base Management Systems (RDBMS), data bases can store objects and such objects can invoke other objects. Processes for invoking such objects involve invoking procedures which may themselves invoke other procedures to several levels. This nested complexity makes the debugging and testing of such objects very time consuming and machine inefficient.

In the past, many attempts have been made to automate the process of generating the complete dependencies of programs and to use it for compiling and debugging code. One such attempt, involved binding together pre-compiled subroutines to form a complete host procedure object code, as described in U.S. Pat. No. 4,330,822 titled "Recursive System and Method for Binding Compiled Routines". Another such attempt, involved reducing the compilation time of modules using one level of module dependencies, as described in U.S. Pat. No. 5,586,328 titled "Module Dependency based Incremental Compiler and Method." Yet another attempt, involved generating complementary source code to resolve external dependencies of program units to facilitate unit testing, as described in U.S. Pat. No. 6,651,111 titled "Method and Apparatus for producing a software test system using complementary code to resolve external dependencies". Yet another attempt, involved building an object oriented software program using compiler generated direct dependency information described in U.S. Pat. No. 5,758,160 titled "Method and apparatus for building a software program using dependencies derived from software component interfaces". In all of these cases only the direct dependencies of the modules concerned are used. In a database programming environment, spending an inordinate amount of time finding the dependencies of program units using a compiler is undesirable, since that information is directly available from the database catalog. Many other U.S. patents describe various debugging and testing systems but none of these which is known to Applicant provides the method and system of the present invention for automatically generating the complete dependencies necessary to debug code objects.

It would be advantageous to have a method for automatically generating debug versions of a subprogram and all its dependencies. The method should allow fixing coding errors much faster by eliminating the need for generating debug versions of all dependent subprograms in a manual fashion. The method should also allow detecting potential runtime errors, before the subprogram is debugged or executed. This would allow the elimination of some of the run time errors that can be very hard to detect in a production environment. The method should also allow programmers to visualize a graphic representation of the complete dependencies of subprograms. The method should also allow programmers to visualize INVALID database objects in the dependency graph. The method should also allow visually identifying cyclic dependencies. This would eliminate the need for programmers spending time figuring out the actual dependencies, the nature of such dependencies and the validity of such dependent objects. This process involves a combination of browsing the source code and looking up the database catalog for specific dependency information. This manual process can be exhaustive, since multiple levels of dependencies are prevalent in database development environments.

For example, the technical problem can be appreciated with the following additional information:

PL/SQL is a complex language, that allows complex interdependent code to be developed. Code modules in PL/SQL can reside in separate library units that reference one another. There are four main types of library units:

1. Packages are true libraries that can include one or more stored procedures and one or more functions. Each of those objects can be public or private. Public objects (exposed in the package spec) can be invoked from other library units. Private objects can be invoked internally within the package. Each object (procedure or function) can invoke other objects within the package or external to it.
2. Stored procedures are stored objects that include only one callable module. Code in a procedure can invoke external objects.
3. Functions are stored objects that include only one Callable module. Code in a function can invoke external objects. Functions differ from procedures by returning a value.
4. Triggers are stored objects that are fired by the database engine when various events occur. Triggers can invoke external objects.

Oracle8™ also has Types which are abstract data types that can hold data members and member functions.

The debug process involves an object and all its dependencies. If a logical problem exists with a value returned or set by a called object, then the coding error might exist in either the called object itself, or one of the called objects. A true debugger should let the developer step through the code traversing dependencies at will, without any special effort. The level of complexity in large applications can easily reach 5 to 10 levels of dependency and the dependency tree can include hundreds of objects.

The alternative for the debugger automatically detecting all the dependencies is for the user to manually analyze the dependencies for the objects and then perform a process that alters all those objects to debug mode, so that they can be debugged. In the example mentioned above, with hundreds of dependent objects this process is tedious and time-consuming.

Alternatively, users can compile all their objects in debug mode, but this again is not optimal, since upon completion of the debug phase they will have to re-compile everything again (for production). Then, for every bug discovered later, the same process is required.

Some RDBMS try to provide assistance in handling these problems. For example, Oracle provides the 'connect by' clause to generate an implicit tree as the result of SQL query. This method of querying could be applied to provide a partial solution to the problem of generating the complete dependency tree of a stored code object. The method can only provide a partial solution because of the way some of the Oracle code objects behave. Specifically, packages are implemented in Oracle as two distinct code objects—a package specification and a package body. Applying the 'connect by' clause above will result in a tree that will contain dependencies of all the package specifications in the dependency tree but not of the corresponding package bodies. A variation of the 'connect by' clause that also tracks package body dependencies cannot be constructed because SQL does not provide a way of saying not to connect any further, if a condition is satisfied—i.e. to prevent infinite recursion in the dependency tree, it is imperative to support a way by which, if a dependency already occurs in the tree in the parent path, we should not proceed to get the dependency of the object again.

The present invention is an efficient and effective solution to the technical problem of retrieving all object dependencies from obects stored in a RDBMS. The solution to this technical problem developed by applicants uses a query that is called recursively. An array is used to track the parents so that the graph can be reconstructed. At each step, it is determined whether the dependency already occurs in the graph. If it occurs, the recursion is stopped.

DISCLOSURE OF THE INVENTION

A system, method and database development tool are disclosed for automatically generating the complete dependencies of a stored code object in a database by applying a set of recursive procedures and parsing the source code of the code objects.

Also a method for generating a cyclic graph of dependencies based on the complete dependency information and their relationship with one another is claimed. Additionally claimed are a method for generating debug versions of stored code objects and all its dependencies. Also claimed is a method for identifying potential run-time errors based on the information about the validity of the dependent code objects. Also claimed is a method for identifying the cyclic dependencies of a database code object. Also claimed is a method of debugging code objects in a database using the complete dependency graph of the particular code object. Also claimed is a method of developing database programs comprising a computer system and a program code mechanism for automatically generating complete dependencies of stored code objects.

Other embodiments of the present invention will become readily apparent to those skilled in these arts from the following detailed description, wherein is shown and described only the embodiments of the invention by way of illustration of the best mode known at this time for carrying out the invention. The invention is capable of other and different embodiments some of which may be described for illustrative purposes, and several of the details are capable of modification in various obvious respects, all without departing from the spirit and scope of the present invention.

BRIEF DESCRIPTION OF THE DRAWINGS

The features and advantages of the system and method of the present invention will be apparent from the following description in which:

FIG. 7 shows a sample dependency-tracking array, which is the base data structure used for storing the data elements of the dependency graph.

BEST MODE FOR CARRYING OUT THE INVENTION

Figure 1:
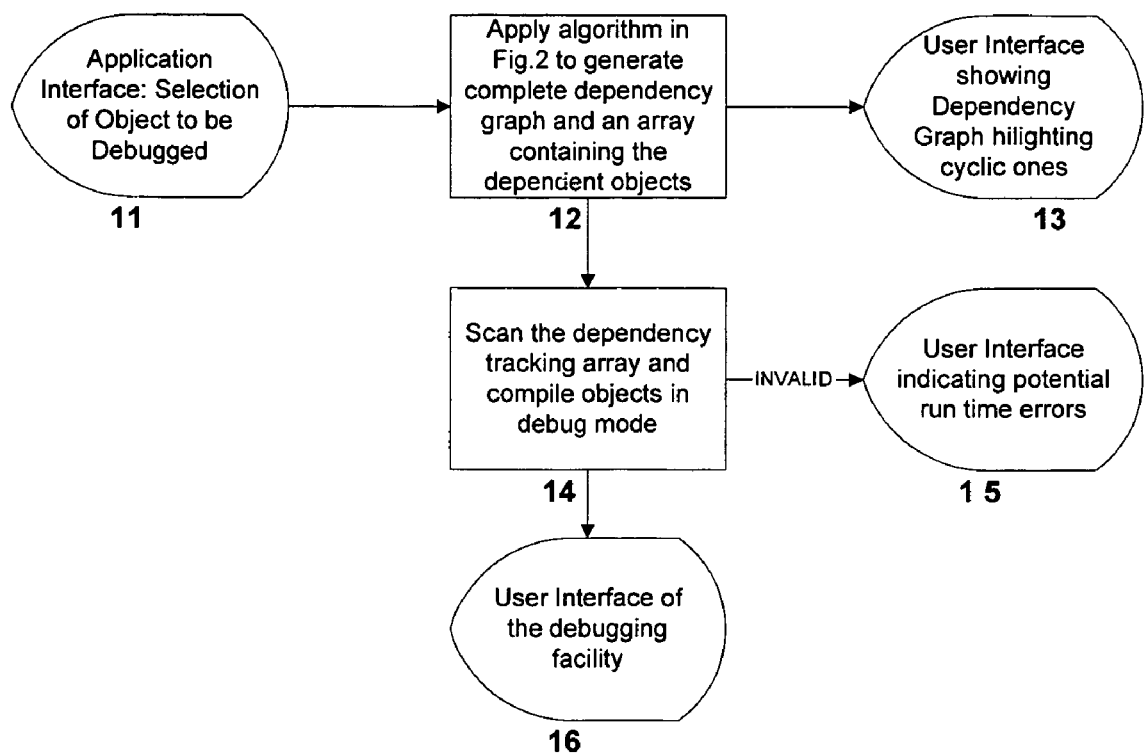
FIG. 1 illustrates a flowchart of the overall flow of a preferred embodiment of the present invention.

The present invention provides a method and apparatus for generating the complete dependency graph of a database code object. The ability to debug a code object is a fundamental requirement for a developer. This allows verifying the logic of code objects as they are being developed.

In the following description for purposes of explanation, specific data and configurations are set forth in order to provide a thorough understanding of the present invention. In the presently preferred embodiment the invention is described in terms of an Oracle Integrated development Environment (IDE). However, it will be apparent to one skilled in these arts that the present invention may be practiced without the specific details, in various Data Base systems such as Sybase, Microsoft SQLServer, UDB, DB2, Informix, etc. In other instances, well-known systems and protocols are shown and described in diagrammatical or block diagram form in order not to obscure the present invention unnecessarily.

ADDITIONAL BACKGROUND INFORMATION

As the data stored in DBMS grows more complex, the SQL queries used to retrieve and/or update the data are growing more complex as well. This has lead to the addition of procedural and object oriented extensions to the standard SQL language. PL/SQL™ is a transaction processing language that offers procedural and object oriented extensions to program against the Oracle database. Other databases provide similar procedural and object oriented extensions. The increasing complexity of these languages has lead to the development of special debuggers that run the SQL language statements under tight control and allow the developer to interact with and analyze the statements as they are executed.

The combination of interactive debugging with code objects that reside on the server has lead to a problem where the debugger must be configured for the procedure that is being debugged and all its dependent procedures. Specifically, the 'step into' operation that allows you to step into dependent objects will work only if those code objects are configured to be debugged. So the user either has to identify and configure all procedures that will be used, including procedures called by those procedures or else they give up the full debugging control.

This is a cumbersome process and frequently leads to frustration on the part of the developer.

PL/SQL is a complex language that allows complex interdependent code to be developed. Code modules in PL/SQL can reside in separate code objects that reference one another. Code objects in PL/SQL take the form of one of the following:

a) A PL/SQL stored procedure, which is a routine that can take input parameters and return output parameters, b) A PL/SQL stored function, which is a routine that can take input parameters and return output parameters. In addition stored functions can be used in an expression and returns a value of a particular type declared in the specification, c) A PL/SQL stored package specification, which forms the specification for a collection of stored functions and procedures identified as a single named entity, d) A PL/SQL stored package body, which forms the implementation for a collection of stored functions and procedures identified as a single entity, e) A PL/SQL stored type specification(Oracle8™ only), which forms the specification for a collection of data elements and member functions identified as a single named entity, f) A PL/SQL stored type body(Oracle8™ only), which forms the implementation for a collection of member functions identified as a single entity, g) A PL/SQL stored trigger, which is a routine that gets executed automatically, when a data manipulation statement is executed in the database server and h) An anonymous PL/SQL block, which is an unnamed set of PL/SQL statements that can be executed on the server.

Databases support object-oriented programming in different ways. Oracle7™ supports this programming methodology through PL/SQL stored Package Specifications and PL/SQL stored Package Bodies. Although the syntax of such support is different on different databases, the fundamental concept of having a specification which can represent an abstract data type and an implementation which implements the specification is supported in all databases. (Oracle, Oracle7, Oracle8, and PL/SQL are trademarks of Oracle Corporation).

The debug process involves an object and all its dependencies. If a logical problem exists with a value returned or set by a called object, then the coding error might exist in either the called object, or one of the dependencies of the called objects. A true debugger should let the developer step through the code traversing dependencies at will, without any special effort. The level of complexity in large applications can easily reach 5 to 10 levels of dependency and the dependency tree can include hundreds of objects.

The alternative for the debugger automatically detecting all the dependencies is for the user to manually analyze the dependencies for the objects and then perform a process that alters all those objects to debug mode, so that they can be debugged. In the example mentioned above, with hundreds of dependent objects this process is tedious and time-consuming.

Alternatively, users can compile all their objects in debug mode, but this again is not optimal, since upon completion of the debug phase they will have to re-compile everything again (for production). Then, for every bug discovered later, the same process is required.

Operating Environment

Figure 9:
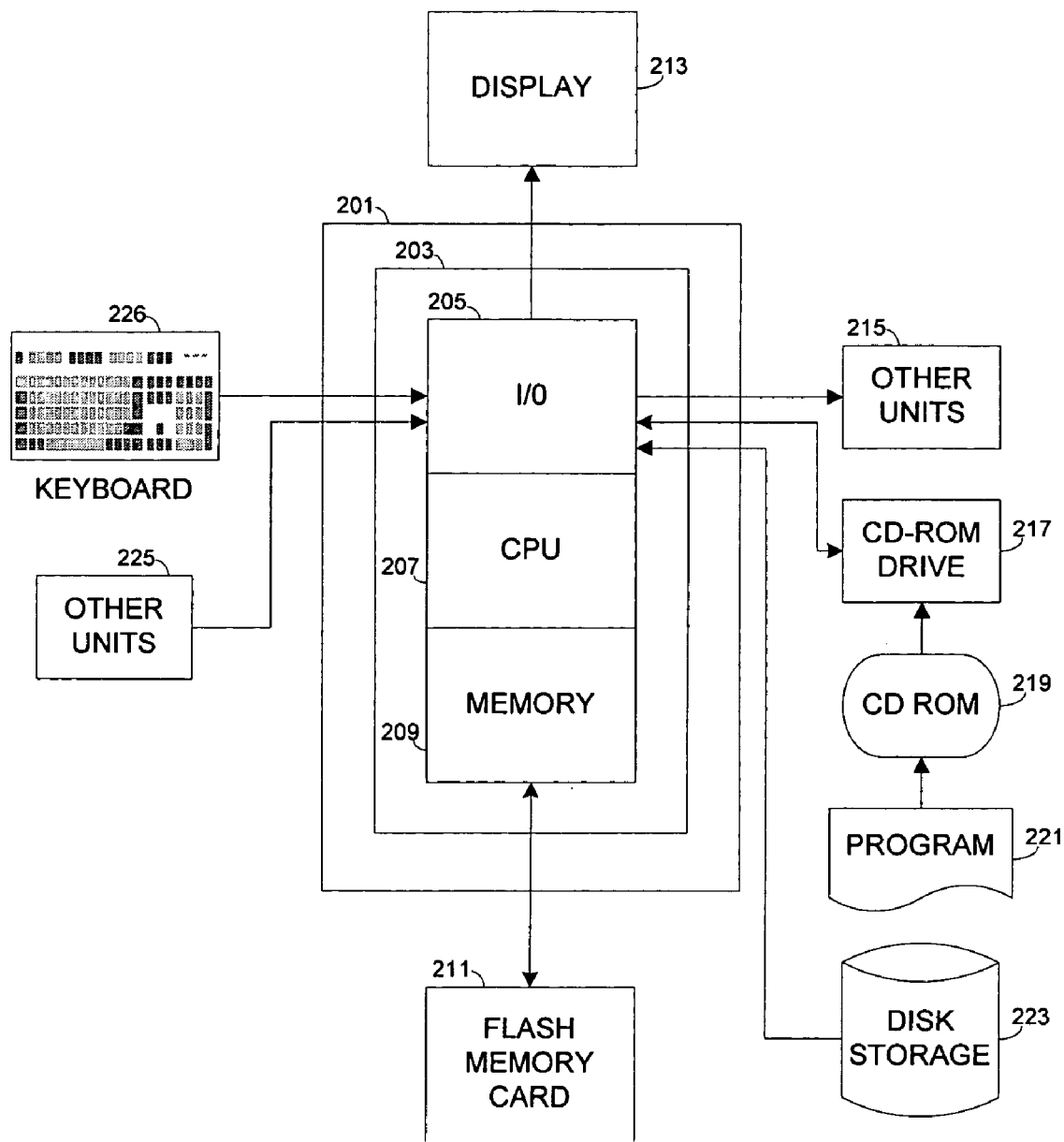
FIG. 9 illustrates a representative general purpose computer configuration useable as either a client PC and/or a server in the preferred embodiment of the present invention.

The present invention operates in and as a part of a general purpose computer unit which may include generally some or all of the elements shown in FIG. 9, wherein the general purpose system 201 includes a motherboard 203 having thereon an input/output ("I/O") section 205, one or more central processing units ("CPU") 207, and a memory section 209 which may have a flash memory card 211 related to it. The I/O section 205 is connected to a keyboard 226, other similar general purpose computer units 225, 215, a disk storage unit 223 and a CD-ROM drive unit 217. The CD-ROM drive unit 217 can read a CD-ROM medium 219 which typically contains programs 221 and other data. Logic circuits or other components of these programmed computers will perform series of specifically identified operations dictated by computer programs as described more fully below.

The Preferred Embodiment

The present invention provides a method and apparatus for generating the complete dependency graph of a stored code object. In a preferred embodiment, the method generates the complete dependency graph of a stored code object in an Oracle database. The method takes into consideration, getting the dependencies of object oriented code objects that have implementations that are separate from specifications. In the preferred embodiment, this involves incorporating the dependencies of Package and Type Bodies in addition to the dependencies of Package and Type Specifications. The method also takes into considerations dependencies on database Triggers. Triggers are code objects that are executed automatically as a result of executing a Data Manipulation Statement (DML) that modifies data in a particular table. Other code objects are not directly dependent on triggers. However, an indirect dependency is possible, when the code object executes a DML statement that automatically executes ("fires") the trigger. The present invention accomplishes this through a process described by the following algorithm:

1. Using a recursive procedure that returns dependencies of procedural code objects and dependencies of specifications of object oriented code objects, based on a query against the database that returns a single level of dependencies.

2. Using the recursive procedure in Step 1 to determine the dependencies of implementations of object oriented code objects, based on a query against the database that returns a single level of dependencies.

3. Using a source code parsing procedure to identify DML statements that can "fire" triggers. Specifically, the parser looks for UPDATE, DELETE and INSERT statements. The parser identifies the type of the statement and also the database table. The algorithm then checks whether a corresponding trigger exists in the database. This identifies the dependencies on triggers of any stored code object. The flowchart in FIGS. 4 and 5 explains a variation of this algorithm that starts with the dependencies on tables working backward to find the dependencies on triggers.

4. Using the recursive procedure in Step 1 to determine the dependencies of triggers found in Step 3, based on a query against the database that returns a single level of dependencies.

5. Repeating Steps 2 through 4 until there are no new dependencies.

The general flow of the preferred embodiment is now described with reference to the FIG. 1.

The user interface element component 11 is used to select a code object from the database. The selected code object provides the information required in generating the dependency information. Component 12 is used to generate the complete dependency graph of the selected object. It generates a data structure that holds the complete dependency information hereby termed a tracking array. The tracking array is used by Component 13 to generate a User Interface element that shows the complete dependency graph. Component 14 scans the tracking array and compiles the objects in debug mode. This step ensures transparent "Step Into" operation from the Debugging facility. If any of the objects that are compiled in debug mode are INVALID, Component 15 shows the complete dependency graph with INVALID objects highlighted. INVALID objects in the complete dependency graph identifies code paths that can result in runtime errors. This functionality is indispensable for database programmers since otherwise a tremendous amount of time may be spent trying to identify the source of a run-time error. Component 14 scans the dependency array and for each object in the array, checks whether that object is part of a cyclic dependency. A well-known graph traversal algorithm is used for the purpose. Cyclic elements of the graph are then highlighted in a User Interface component that displays the dependency graph. Component 16 uses the tracking array generated in Component 12 and the objects compiled in debug mode to launch the Debugger.

The general technical solution to the problem is now described with reference to FIGS. 2 through 5.

Figure 2:
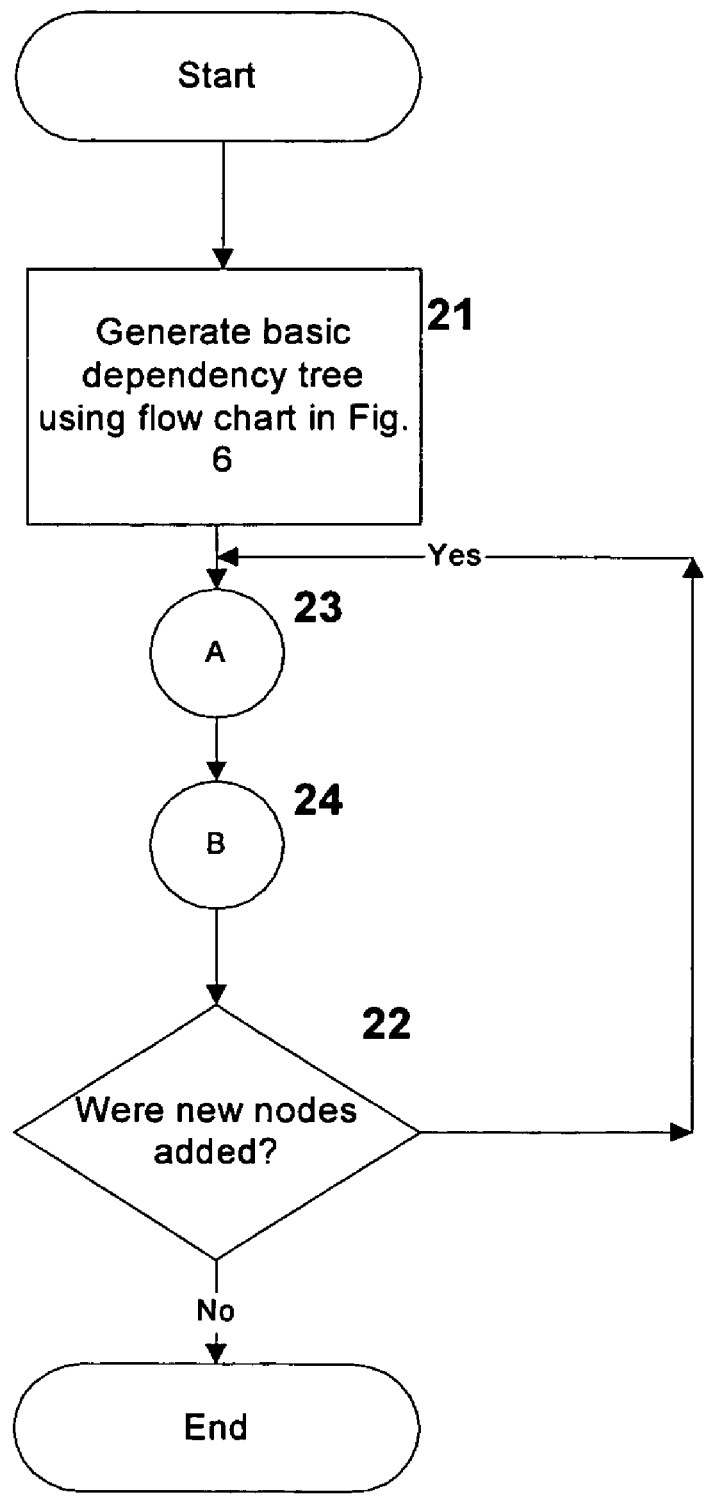
FIG. 2 illustrates a flowchart showing the general processing flow of the recursive analysis steps of the preferred embodiment.
Figure 6:
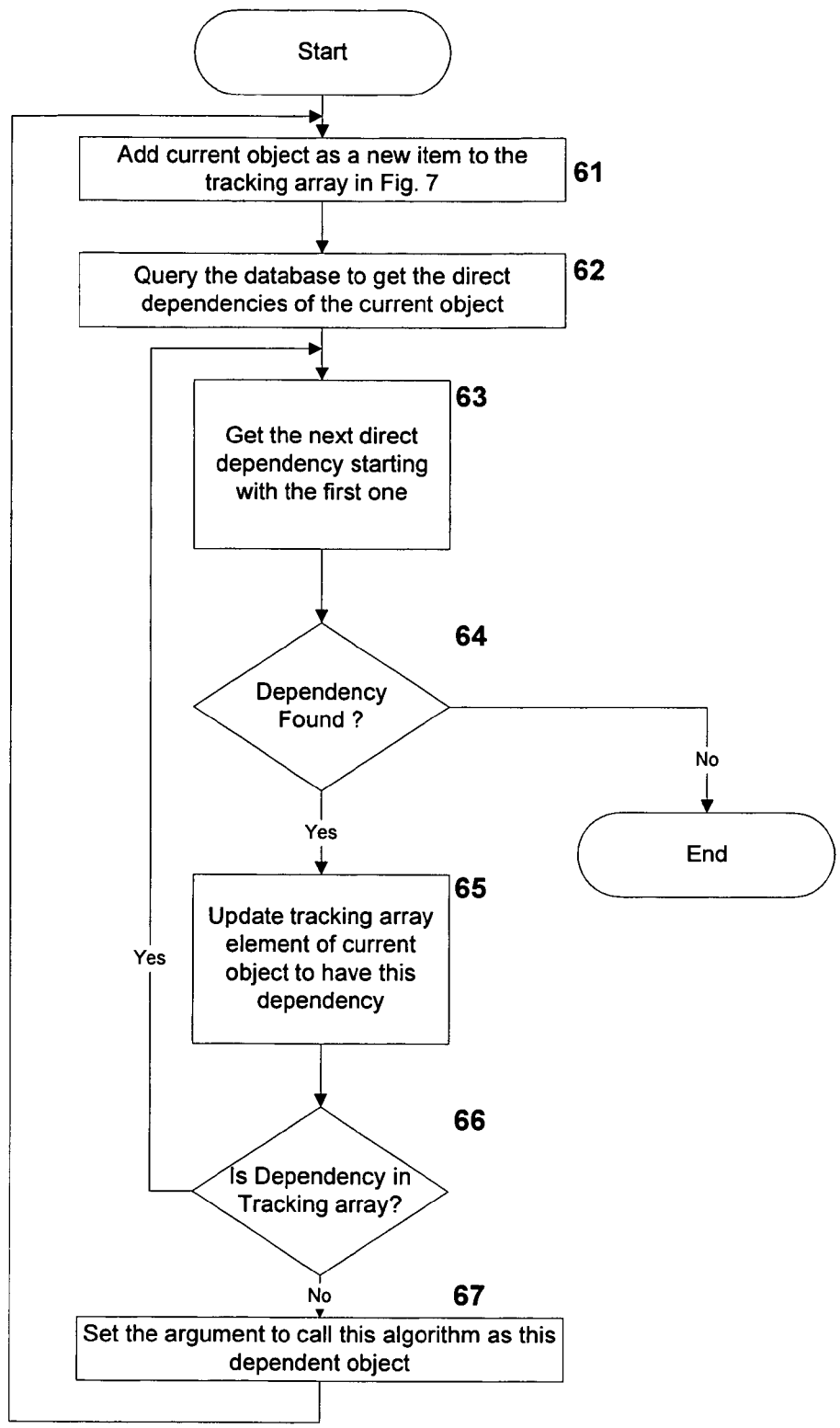
FIG. 6 illustrates a flowchart showing the steps involved in getting the dependencies of a code object that does not take into consideration the indirect dependencies such as the dependencies of package bodies and dependencies on triggers.

Component 21 in FIG. 2 applies the flowchart in FIG. 6 to generate a tracking array of dependent code objects. The array data structure shown in FIG. 7 contains all the information necessary to draw a dependency graph. The algorithm does not take into consideration dependencies on triggers as well as dependencies on implementations of object oriented code objects. As a result, after the initial array data is generated in block 21, flow then proceeds to component A 23 which is described below with respect to FIG. 3 wherein the dependencies on implementations of object oriented code objects are identified. Then the system flow proceeds to component B 24 which is described in below with respect to FIG. 4 wherein any dependencies on triggers are evaluated. After determining that no new nodes were found (component 22) the routine is completed with the array containing all dependencies of the target object.

Figure 3:
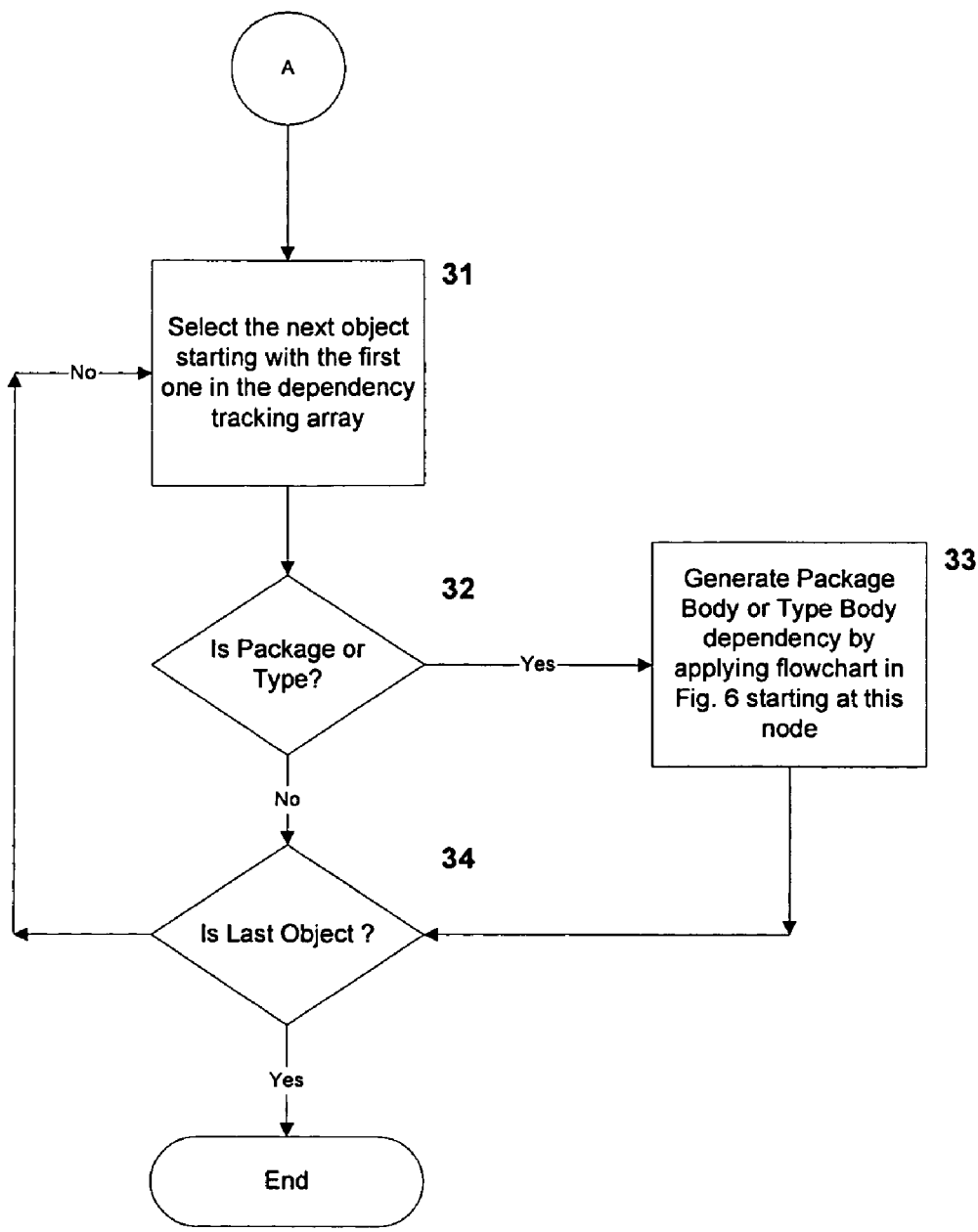
FIG. 3 illustrates a flowchart showing the steps used to incorporate dependencies of package bodies into dependency graph.

Referring now to FIG. 3, Component 31 selects the next code object starting with the first one in the tracking array. Component 32 checks whether the code object is a Package or a Type. (Packages are defined and described in Chapter 7, Oracle7™ Server Application developers Guide, which is hereby incorporated fully herein by reference. Types are defined and described in Oracle8 SQL Reference, Release 8.0, which is hereby incorporated fully herein by reference). If it is a package or type, Component 33 applies the flowchart in FIG. 6 again to incorporate the dependencies of the package body or the type body respectively into the tracking array. Component 34 then checks whether this is the last object in the tracking array.

Figure 4:
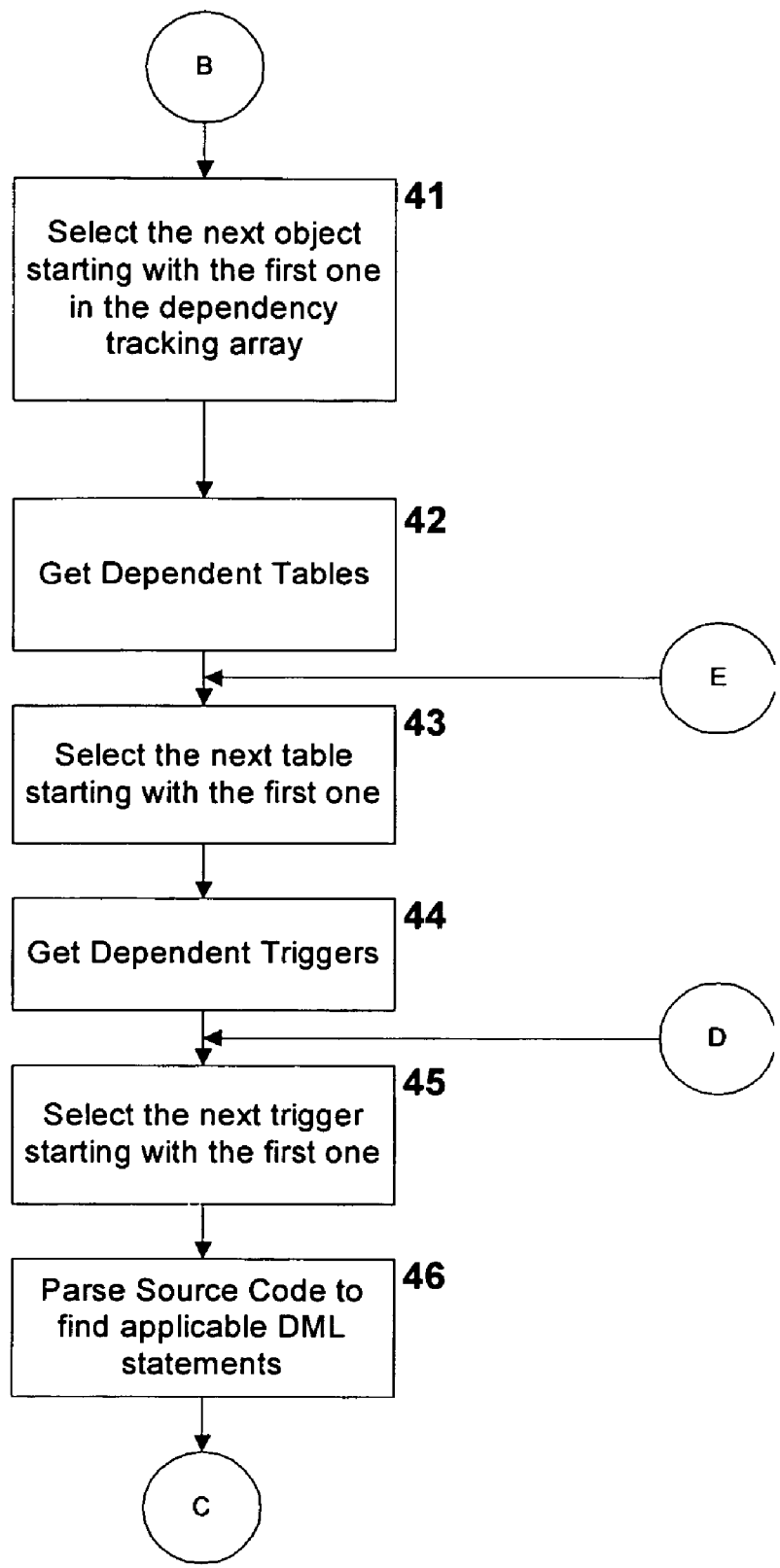
FIGS. 4 and 5 together illustrates a flowchart showing the steps used to incorporate dependencies on database triggers and their dependencies into the dependency graph.
Figure 5:
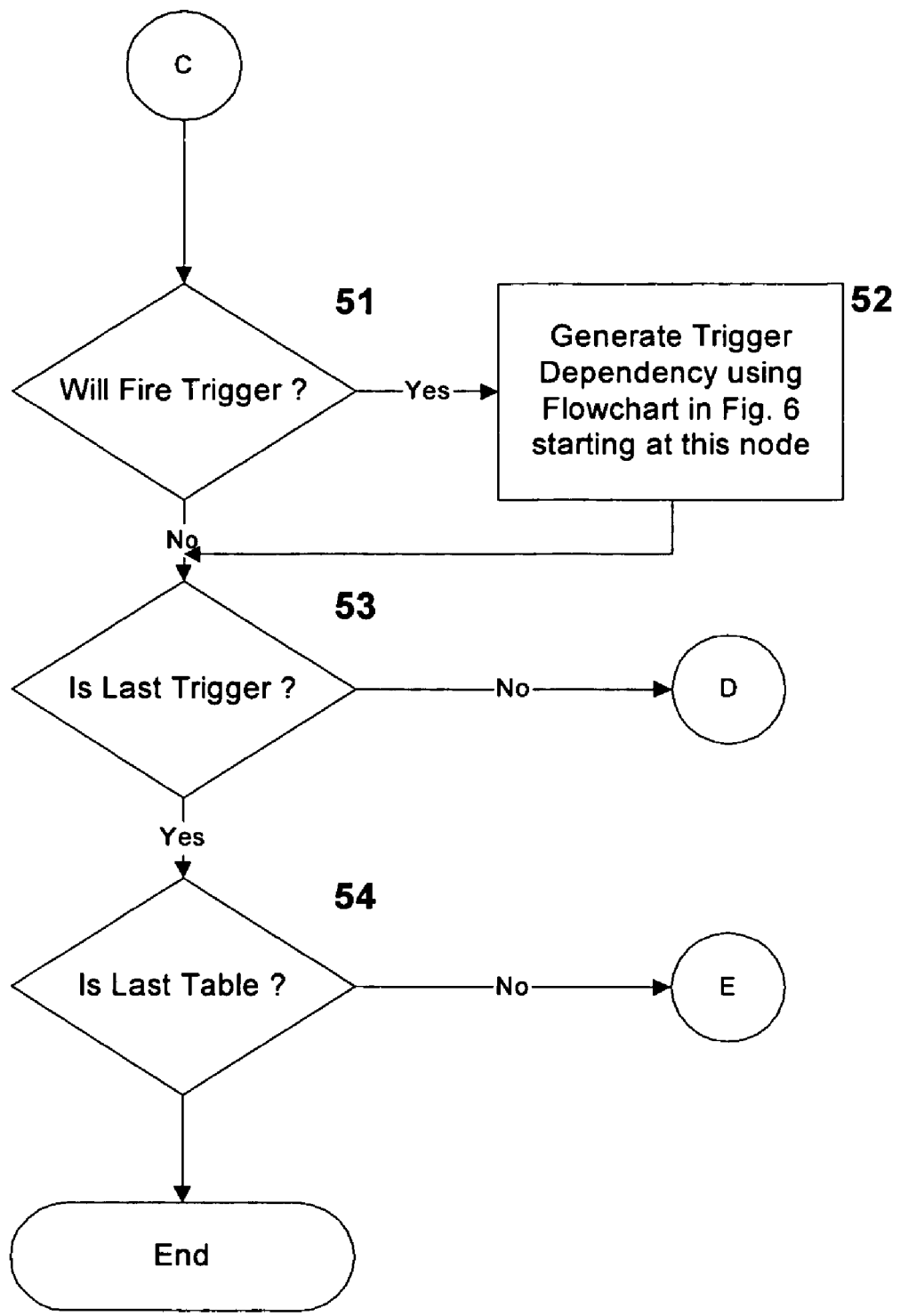

Component 41 in FIG. 4 selects the next code object starting with the first one in the tracking array. Component 42 gets the dependencies on database tables of the code object using a database query against the catalog. Component 43 selects the next database table dependency starting with the first one. Component 44 gets the dependencies on database triggers of the database table. (Triggers are defined and described in Chapter 8, Oracle7™ Server Application developers Guide, which is hereby incorporated fully herein by reference). Component 45 selects the next database trigger dependency starting with the first one. Component 46 parses the source code of the code object to verify whether a Data Manipulation Statement (DML) that "fires" the trigger is present in the source code. If such a statement is present, component 52 in FIG. 5 applies the flowchart in FIG. 6 again to incorporate the dependencies of the trigger into the tracking array. Component 53 in FIG. 5 checks whether this is the last trigger dependency. If No, Control returns to Component 45 in FIG. 4 that selects the next trigger dependency. If Yes, Component 54 in FIG. 5 checks whether this is the last table dependency. If No, Control returns to Component 43 in FIG. 4 that selects the next database table dependency. If Yes, Control shifts to Component 22 in FIG. 2 that checks whether a new node was added during application of the algorithms in FIGS. 3 and 4. If No, the algorithm terminates and the tracking array contains the complete dependency information of the selected code object.

A more detailed description of the basic recursive process is now described with reference to FIG. 6 and FIG. 7.

The current code object is passed in as an argument to the algorithm in FIG. 6. Component 61 in FIG. 6 adds the current code object as a new item in the tracking array. A sample item in a tracking array is depicted in FIG. 7. As illustrated, the tracking array consists of the following elements—the object id number 71 that uniquely identifies the object in the database, the object name 72, the owner of the object 73, a flag indicating whether the object is residing in the current database 74, the type of the object 75 and a variable number of child object ids 76. The child object ids 76 track the direct dependencies of a particular code object. Referring again to FIG. 6, Component 62 queries the database catalog to get the direct dependencies of the current object. Component 63 then gets the next direct dependency starting with the first one. Component 64 checks whether a dependency was found in Component 63. If none was found, the algorithm terminates. If one was found, Component 65 then updates the tracking array element of the current object to contain this dependency. This is done by adding the object id of the dependent object as a child object id in to the tracking array element of the current object. Component 66 then checks whether this dependent object is already present in the tracking array. If Yes, Control shifts to component 63 which gets the next direct dependency. If No, the algorithm is recursively called by passing in this dependent object as the argument.

An example, which depicts a typical object and its dependency analysis, is now described with reference to FIG. 8.

Following is an example of a typical stored function:
1. create or replace function CheckGender return number
2. as
3. begin
4. proc1;
5. proc2;
6. proc3;
7. end;
8. /

Figure 8:
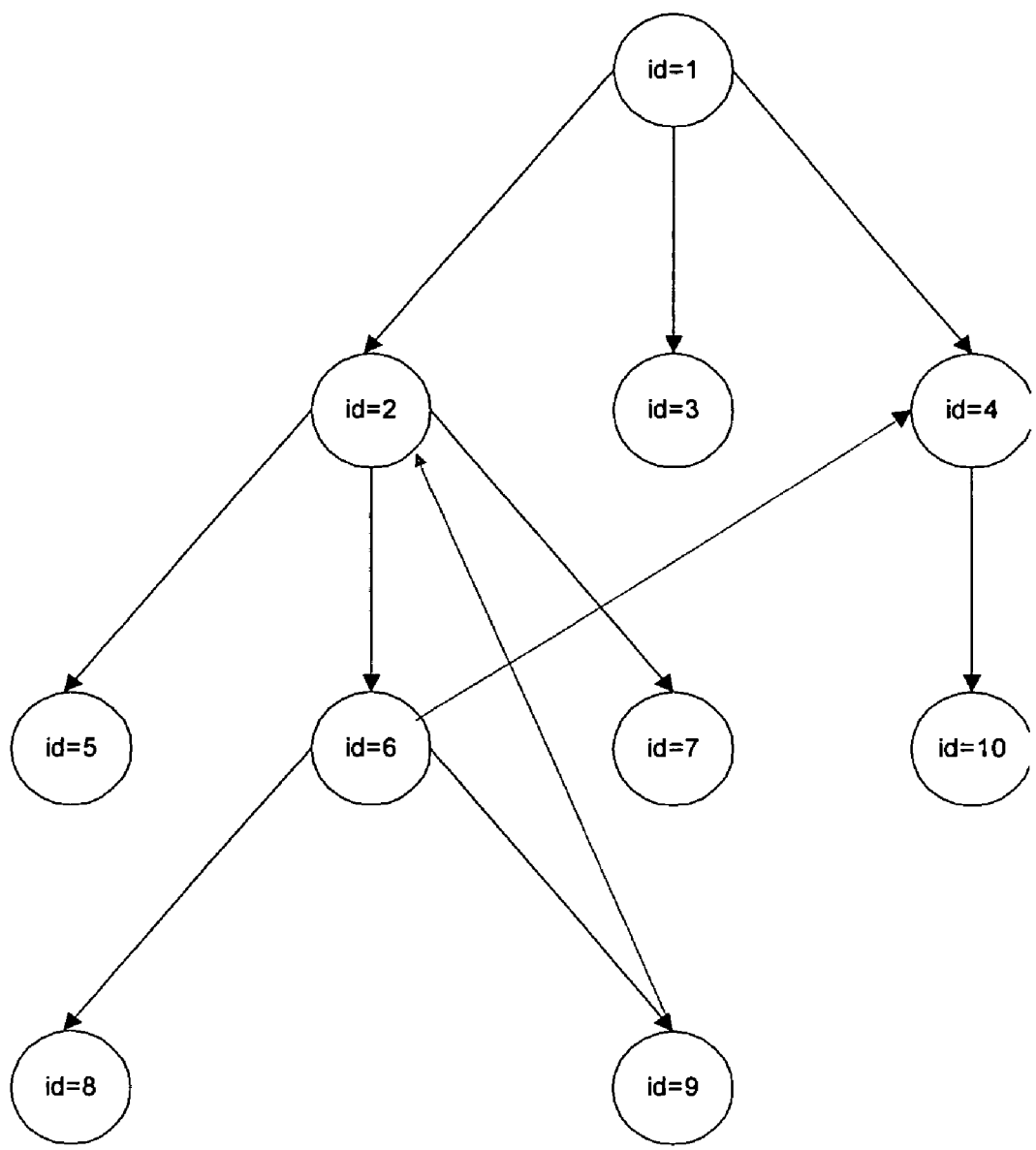
FIG. 8 is a sample object tree used for purposes of illustration.

The function is depicted as the node with 'id=1' in FIG. 8. The function has direct dependencies on 3 procedures 'proc1', 'proc2' and 'proc3' depicted in FIG. 8 as the nodes with 'id=2', 'id=3', and 'id=4' respectively. The procedure 'proc2' does not have any dependencies. The procedure 'proc3' has a dependency on a procedure 'proc6' depicted in FIG. 8 as the node with 'id=10'. For illustrative purposes, the source code of 'proc1' is shown below:
1. create or replace procedure proc1 as
2. begin
3. proc4;
4. insert into table1 values (1);
5. proc5;
6. end;
7. /

The procedure 'proc1' has direct dependencies on procedure 'proc4' and 'proc5' depicted in FIG. 8 as nodes with 'id=5' and 'id=7'. The procedure also has a Data Manipulation Statement (DML) that fires an insert trigger 'trig1' depicted as the node with 'id=6' in FIG. 8. The trigger 'trig1' in turn has dependencies on procedures 'proc3' and 'proc7' depicted in FIG. 8 as the nodes with 'id=4' and 'id=8' respectively. The trigger 'trig1' also has a dependency on a stored package 'pack1' depicted in FIG. 8 as the node with 'id=9'. The specification of 'pack1' does not have any dependencies. However, the body of 'pack1' has a dependency on procedure 'proc1' depicted in FIG. 8 as the node with 'id=2'.

In this example, the algorithm works as follows: Applying the algorithm depicted in FIG. 6 (the first step in the algorithm in FIG. 2) yields the basic dependency graph consisting of objects with ids 1, 2, 3, 4, 5, 7 and 10. The tracking array now has 7 items. Item 1 has object id 1 and has entries 2, 3 and 4 as child object ids. Item 2 has object id 2 and has entries 5 and 7 as child object ids. Item 3 has object id 3 and has no child objects. Item 4 has object id 4 and has entry 10 as the only child object id. Item 5 has object id 5 and has no child objects. Item 6 has object id 7 and has no child object ids. Item 7 has object id 10 and has no child object ids. Notice that the dependency of 'proc1' (id=2) on the trigger 'trig1' (id=6) is not incorporated yet. The dependencies of the trigger 'trig1' are also not incorporated yet. Applying the algorithm in FIG. 3 then yields the exact same graph with no changes. Applying the algorithm in FIGS. 4 and 5 then yields a dependency graph that includes all the nodes in the complete dependency graph. Item 2 now has id 6 as an additional child object. The tracking array now has 10 items. Item 8 has object id 6 and has entries 8, 9 and 4 as child object ids. Item 9 has object id 8 and has no child object ids. Item 10 has object id 9 and has no child object ids. However, the dependency of the body of package 'pack1' (id=9) on the procedure 'proc1' (id=2) is not yet incorporated in the dependency graph. We then apply the algorithms in FIGS. 3 through 5 again, since the condition in component 22 in FIG. 2 evaluates to 'Yes'—Nodes with ids 6, 8 and 9 were added when we applied the algorithms in FIGS. 3 through 5. Applying algorithm in FIG. 3 yields the complete dependency graph—the dependency of the package body of 'pack1' (id=9) on the procedure 'proc1' (id=2) is added during this step. Item 10 in the tracking array now has a child object id 2. Applying the algorithm in FIGS. 4 and 5 does not change the dependency graph. The condition in component 22 in FIG. 2 now evaluates to 'No', since no new nodes were added. The algorithm in FIG. 2 terminates. The tracking array now holds the information needed to generate a complete dependency graph. The tracking array is then scanned to generate the debug versions of all objects in the dependency graph. If any of the objects so compiled is INVALID, such objects are highlighted in the generated dependency graph. For each object in the tracking array a well-known graph traversal algorithm is applied to identify whether they are part of a cyclic dependency. Such cyclic paths in the graph are then highlighted. In the present example object ids 2, 6 and 9 form a cyclic path and so those nodes and the paths are highlighted. This identifies a potential infinite loop at runtime. The graph identifies the possibility that, when the trigger 'trig1' (id=6) fires and the package body code gets executed, the package body of 'pack1' (id=9) may in turn call the procedure 'proc1' (id=2) thereby resulting in a potential infinite loop.

Having described the invention in terms of a preferred embodiment, it will be recognized by those skilled in the art that various types of general purpose computer hardware may be substituted for the configuration described above to achieve an equivalent result. Similarly, it will be appreciated that arithmetic logic circuits are configured to perform each required means in the claims for processing internet security protocols and tunneling protocols; for permitting the master unit to adaptively distribute processing assignments for incoming messages and for permitting cluster members to recognize which messages are theirs to process; and for recognizing messages from other members in the cluster. It will be apparent to those skilled in the art that modifications and variations of the preferred embodiment are possible, which fall within the true spirit and scope of the invention as measured by the following claims.

What is claimed is:

1. A method of generating dependency information for code objects stored in a database, comprising:
   recursively querying a database for one or more dependencies of procedural code objects stored in the database;
   identifying one or more dependencies of procedural code objects stored in the database;
   generating a dependency information tracking array based on the identification of one or more dependencies of procedural code objects; and
   stopping the recursive query of the database upon identifying a dependency that is already included in the dependency information tracking array.

2. The method of claim 1, further comprising:
   recursively querying the database for one or more dependencies of specifications of object-oriented code objects stored in the database;
   identifying one or more dependencies of specifications of object-oriented code objects stored in the database; and
   incorporating the one or more dependencies of specifications of object-oriented code objects into the dependency information tracking array.

3. The method of claim 2, wherein the specifications of object-oriented code objects comprise PL/SQL specifications for a collection of stored functions and procedures identified as a single entity.

4. The method of claim 1, further comprising:
   recursively querying the database for one or more dependencies of implementations of object-oriented code objects in the database;
   identifying one or more dependencies of implementations of object-oriented code objects in the database; and
   incorporating the one or more dependencies of implementations of object-oriented code objects in the database into the dependency information tracking array.

5. The method of claim 4, wherein the implementations of object-oriented code objects comprise PL/SQL implementations for a collection of stored functions and procedures identified as a single entity.

6. The method of claim 1, further comprising:
   parsing the source code of the database for data manipulation statements that fire triggers; and
   identifying one or more data manipulation statements that fire triggers.

7. The method of claim 6, wherein parsing the source code of the database for data manipulation statements that fire triggers comprises parsing the source code for UPDATE, DELETE, or INSERT statements.

8. The method of claim 6, further comprising:
   recursively querying the database for one or more dependencies on triggers of code objects stored in the database based on the one or more data manipulation statements that fire triggers;
   identifying one or more dependencies on triggers of code objects stored in the database; and
   incorporating the one or more dependencies on triggers of code objects stored in the database into the dependency information tracking array.

9. The method of claim 1, further comprising compiling one or more code objects stored in the database in debug mode using a database code object debugging tool.

10. The method of claim 1, further comprising identifying one or more dependent objects stored in the database that are INVALID.

11. The method of claim 1, further comprising generating a dependency graph for code objects stored in the database based at least in part on the dependency information tracking array.

12. The method of claim 1, wherein the database comprises a database catalog; and
wherein querying the database comprises querying the database catalog.

13. The method of claim 1, further comprising displaying a dependency graph to a user, the dependency graph generated based at least in part on the dependency information tracking array.

14. The method of claim 1, further comprising identifying one or more cyclic dependencies among code objects stored in the database.

15. A method of generating dependency information for code objects stored in a database, comprising:
recursively querying a database for one or more dependencies of procedural code objects stored in the database;
identifying one or more dependencies of procedural code objects stored in the database;
generating a dependency information tracking array based on the identification of one or more dependencies of procedural code objects; and
identifying one or more cyclic dependencies among code objects stored in the database.

16. The method of claim 15, wherein identifying one or more cyclic dependencies comprises utilizing a graph traversal algorithm to identify one or more cyclic dependencies.

17. A method of generating dependency information for code objects stored in a database, comprising:
recursively querying a database for one or more dependencies of procedural code objects stored in the database;
identifying one or more dependencies of procedural code objects stored in the database;
recursively querying the database for one or more dependencies of specifications of object-oriented code objects stored in the database;
identifying one or more dependencies of specifications of object-oriented code objects stored in the database;
recursively querying the database for one or more dependencies of implementations of object-oriented code objects in the database;
identifying one or more dependencies of implementations of object-oriented code objects in the database;
parsing the source code of the database for data manipulation statements that fire triggers;
identifying one or more data manipulation statements that fire triggers;
recursively querying the database for one or more dependencies on triggers of code objects stored in the database based on the one or more data manipulation statements that fire triggers;
identifying one or more dependencies on triggers of code objects stored in the database; and
generating a dependency information tracking array based on the identification of one or more dependencies of procedural code objects stored in the database, one or more dependencies of specifications of object-oriented code objects stored in the database, one or more dependencies of implementations of object-oriented code objects stored in the database, and one or more dependencies on triggers of code objects stored in the database.

18. The method of claim 17, wherein parsing the source code of the database for data manipulation statements that fire triggers comprises parsing the source code for UPDATE, DELETE, or INSERT statements.

19. The method of claim 17, further comprising compiling one or more code objects in debug mode using a database code object debugging tool.

20. The method of claim 17, further comprising identifying one or more dependent objects in the database that are INVALID.

21. The method of claim 17, further comprising identifying one or more cyclic dependencies among code objects stored in the database.

22. The method of claim 21, wherein identifying one or more cyclic dependencies comprises utilizing a graph traversal algorithm to identify one ore more cyclic dependencies.

23. The method of claim 17, further comprising generating a dependency graph for the code object based at least in part on the dependency information tracking array.

24. The method of claim 17, wherein the database comprises a database catalog; and
wherein querying the database comprises querying the database catalog.

25. A system for generating dependency information for code objects stored in a database, comprising:
a database operable to store code objects; and
a processing system operable to:
recursively query the database for one or more dependencies of procedural code objects stored in the database;
identify one or more dependencies of procedural code objects stored in the database;
generate a dependency information tracking array based on the identification of one or more dependencies of procedural code objects; and
stop the recursive query of the database upon identifying a dependency that is already included in the dependency information tracking array.

26. The system of claim 25, wherein the processing system is further operable to:
recursively query the database for one or more dependencies of specifications of object-oriented code objects stored in the database;
identify one or more dependencies of specifications of object-oriented code objects stored in the database; and
incorporate the one or more dependencies of dependencies of specifications of object-oriented code objects stored in the database into the dependency information tracking array.

27. The system of claim 25, wherein the processing system is further operable to:
recursively query the database for one or more dependencies of implementations of object-oriented code objects stored in the database;
identify one or more dependencies of implementations of object-oriented code objects stored in the database; and
incorporate the one or more dependencies of implementations of object-oriented code objects stored in the database into the dependency information tracking array.

28. The system of claim 25, wherein the processing system is further operable to:
parse the source code of the database for data manipulation statements that fire triggers;
identify one or more data manipulation statements that fire triggers;

recursively query the database for one or more dependencies on triggers of code objects stored in the database based on the one or more data manipulation statements that fire triggers;

identify one or more dependencies on triggers of code objects stored in the database; and incorporate the one or more dependencies on triggers of code objects stored in the database into the dependency information tracking array.

29. A system for generating dependency information for a code object stored in a database, comprising:

a database operable to store a code object; and a processing system operable to:

recursively query the database for one or more dependencies of procedural code objects stored in the database;

identify one or more dependencies of procedural code objects stored in the database;

recursively query the database for one or more dependencies of specifications of object-oriented code objects stored in the database;

identify one or more dependencies of specifications of object-orients code objects stored in the database;

recursively query the database for one or more dependencies of implementations of object-oriented code objects stored in the database;

identify one or more dependencies of implementations of object-oriented code objects stored in the database;

parse the source code of the database for data manipulation statements that fire triggers;

identify one or more data manipulation statements that fire triggers;

recursively query the database for one or more dependencies on triggers of code objects stored in the database based on the one or more data manipulation statements that fire triggers;

identify one or more dependencies on triggers of code objects stored in the database; and generate a dependency information tracking array based on the identification of one or more dependencies of procedural code objects stored in the database, one or more dependencies of specifications of object-oriented code objects stored in the database, one or more dependencies of implementations of object-oriented code objects stored in the database, and one or more dependencies on triggers of code objects stored in the database.

30. A computer-readable medium encoded with logic operable, when executed on a computer processor, to perform the steps comprising:

recursively querying a database for one or more dependencies of procedural code objects stored in the database;

identifying one or more dependencies of procedural code objects stored in the database; and generating a dependency information tracking array based on the identification of one or more dependencies of procedural code objects; and stopping the recursive query of the database upon identifying a dependency that is already included in the dependency information tracking array.

31. The computer-readable medium encoded with logic of claim 30, further operable to perform the steps comprising:

recursively querying the database for one or more dependencies of specifications of object-oriented code objects stored in the database;

identifying one or more dependencies of specifications of object-oriented code objects stored in the database; and incorporating the one or more dependencies of specifications of object-oriented code objects into the dependency information tracking array.

32. The computer-readable medium encoded with logic of claim 30, further operable to perform the steps comprising:

recursively querying the database for one or more dependencies of implementations of object-oriented code objects in the database;

identifying one or more dependencies of implementations of object-oriented code objects in the database; and incorporating the one or more dependencies of implementations of object-oriented code objects in the database into the dependency information tracking array.

33. The computer-readable medium encoded with logic of claim 30, further operable to perform the steps comprising:

parsing the source code of the database for data manipulation statements that fire triggers; and identifying one or more data manipulation statements that fire triggers;

recursively querying the database for one or more dependencies on triggers of code objects stored in the database based on the one or more data manipulation statements that fire triggers;

identifying one or more dependencies on triggers of code objects stored in the database; and incorporating the one or more dependencies on triggers of code objects stored in the database into the dependency information tracking array.

34. A computer-readable medium encoded with logic operable, when executed on a computer processor, to perform the steps comprising:

recursively querying a database for one or more dependencies of procedural code objects stored in the database;

identifying one or more dependencies of procedural code objects stored in the database;

recursively querying the database for one or more dependencies of specifications of object-oriented code objects stored in the database;

identifying one or more dependencies of specifications of object-oriented code objects stored in the database;

recursively querying the database for one or more dependencies of implementations of object-oriented code objects in the database;

identifying one or more dependencies of implementations of object-oriented code objects in the database;

parsing the source code of the database for data manipulation statements that fire triggers;

identifying one or more data manipulation statements that fire triggers;

recursively querying the database for one or more dependencies on triggers of code objects stored in the database based on the one or more data manipulation statements that fire triggers;

identifying one or more dependencies on triggers of code objects stored in the database; and generating a dependency information tracking array based on the identification of one or more dependencies of procedural code objects stored in the database, one or more dependencies of specifications of object-oriented code objects stored in the database, one or more dependencies of implementations of object-oriented code objects stored in the database, and one or more dependencies on triggers of code objects stored in the database.

35. A method of generating dependency information for code objects stored in a database, comprising:

recursively querying a database for one or more dependencies of procedural code objects stored in the database;

identifying one or more dependencies of procedural code objects stored in the database;

generating a dependency information tracking array based on the identification of one or more dependencies of procedural code objects; and for each of the one or more dependencies identified, determining whether the dependency already occurs in the graph; and terminating the recursive query of the database upon determining that one of the one or more dependencies already occurs in the graph.

* * * * *